(12) United States Patent
Winter et al.

(10) Patent No.: US 11,781,481 B2
(45) Date of Patent: Oct. 10, 2023

(54) OIL CIRCULATION SYSTEM FOR HYBRID ELECTRIC ENGINE

(71) Applicant: RTX Corporation, Farmington, CT (US)

(72) Inventors: Michael Winter, New Haven, CT (US); Denman H. James, West Hartford, CT (US); Richard W. Monahan, Farmington, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/839,106

(22) Filed: Jun. 13, 2022

(65) Prior Publication Data

US 2022/0397060 A1 Dec. 15, 2022

Related U.S. Application Data

(60) Provisional application No. 63/209,674, filed on Jun. 11, 2021.

(51) Int. Cl.
| | |
|---|---|
| *F02C 7/06* | (2006.01) |
| *F02C 7/32* | (2006.01) |
| *F01D 25/20* | (2006.01) |
| *F02C 7/28* | (2006.01) |
| *B64D 27/02* | (2006.01) |

(Continued)

(52) U.S. Cl.
CPC ............ *F02C 7/06* (2013.01); *F01D 25/20* (2013.01); *F02C 7/32* (2013.01); *B64D 27/24* (2013.01); *B64D 2027/026* (2013.01); *F01D 15/08* (2013.01); *F01D 25/183* (2013.01);

(Continued)

(58) Field of Classification Search
CPC ...... F02C 7/06; F02C 7/32; F02C 7/28; F01D 25/20; F01D 15/08; F01D 25/183; B64D 27/24; B64D 2027/026; F05D 2220/74; F05D 2260/98

See application file for complete search history.

(56) References Cited

U.S. PATENT DOCUMENTS

| 8,641,366 B1 | 2/2014 | Ullah et al. |
| 10,308,366 B2 | 6/2019 | Kupiszewski et al. |

(Continued)

OTHER PUBLICATIONS

International Search Report; dated Sep. 22, 2022; International Application No. PCT/US2022/033240, Filed Jun. 13, 2022, 5 pages.

(Continued)

*Primary Examiner* — Gerald L Sung
*Assistant Examiner* — Rene D Ford
(74) *Attorney, Agent, or Firm* — CANTOR COLBURN LLP

(57) ABSTRACT

A hybrid electric propulsion system including: a gas turbine engine comprising a low speed spool, a high speed spool, and a combustor; a lubrication circuit comprising a bearing compartment, a supply pump, and a scavenger pump; an electric motor configured to augment rotational power of the low speed spool or the high speed spool; and a controller operable to: control the electric motor based upon a pressure differential between an interior of the bearing compartment and an exterior of the bearing compartment and to drive rotation of the low speed spool and/or the high speed spool via the electric motor responsive to a thrust command while fuel flow to the combustor is inhibited.

17 Claims, 7 Drawing Sheets

(51) Int. Cl.
*F01D 15/08* (2006.01)
*F01D 25/18* (2006.01)
*B64D 27/24* (2006.01)

(52) U.S. Cl.
CPC ............ *F02C 7/28* (2013.01); *F05D 2220/74* (2013.01); *F05D 2260/98* (2013.01)

(56) References Cited

U.S. PATENT DOCUMENTS

| | | | |
|---|---|---|---|
| 10,329,955 | B2 | 6/2019 | Menheere et al. |
| 2007/0289310 | A1* | 12/2007 | Dooley ................ F01D 15/10 60/773 |
| 2016/0160714 | A1 | 6/2016 | James |
| 2017/0211477 | A1 | 7/2017 | Menheere et al. |
| 2018/0050806 | A1 | 2/2018 | Kupiszewski et al. |
| 2018/0252163 | A1 | 9/2018 | Logan et al. |
| 2019/0322379 | A1* | 10/2019 | Mackin ................ F02C 7/057 |
| 2019/0323597 | A1* | 10/2019 | Sheridan ............... F01D 19/00 |
| 2020/0023982 | A1* | 1/2020 | Kupratis ............... B60L 50/61 |
| 2020/0055610 | A1* | 2/2020 | Terwilliger ............ F02C 6/14 |
| 2020/0256251 | A1 | 8/2020 | Hussain |
| 2020/0277075 | A1* | 9/2020 | Dubreuil ............ F01M 11/0004 |
| 2020/0362728 | A1* | 11/2020 | Davies ................. F01D 25/12 |
| 2021/0156280 | A1* | 5/2021 | Gebhard ............... F16N 7/385 |
| 2021/0172333 | A1* | 6/2021 | Suciu .................. F01D 15/10 |
| 2021/0323425 | A1* | 10/2021 | Minshull .............. B64D 27/02 |
| 2022/0042458 | A1* | 2/2022 | Long ................... F02C 7/12 |
| 2022/0042465 | A1* | 2/2022 | Swann .................. F02C 6/00 |

OTHER PUBLICATIONS

Written Opinion; dated Sep. 22, 2022; International Application No. PCT/US2022/033240, Filed Jun. 13, 2022, 9 pages.

* cited by examiner

OIL CIRCULATION SYSTEM FOR HYBRID ELECTRIC ENGINE

CROSS REFERENCE TO RELATED APPLICATIONS

This application claims priority to U.S. Provisional Patent Application Ser. No. 63/209,674 filed on Jun. 11, 2021, the contents of which are incorporated herein by reference thereto.

BACKGROUND

The subject matter disclosed herein relates generally to hybrid electric engines and, more particularly, to a method and an apparatus for providing circulating oil in a hybrid electric engine and/or an engine with electric power assist.

In a hybrid electric system where it is possible to transfer power from the low spool to the high spool to slow down the fan or improve compressor stability, reduction of the low spool speed too far can create an oil containment problem. As such, providing the required amount of oil to the bearings of an engine may be a limiting factor in how much power can be transferred while still maintaining sufficient lubrication.

Accordingly, it is desirable to provide a hybrid electric engine and/or an engine with electric power assist with an oil circulation system that prevents oil containment issues of the oil circulation system.

BRIEF DESCRIPTION

Disclosed is a hybrid electric propulsion system including: a gas turbine engine comprising a low speed spool, a high speed spool, and a combustor; a lubrication circuit comprising a bearing compartment, a supply pump, and a scavenger pump; an electric motor configured to augment rotational power of the low speed spool or the high speed spool; and a controller operable to: control the electric motor based upon a pressure differential between an interior of the bearing compartment and an exterior of the bearing compartment and to drive rotation of the low speed spool and/or the high speed spool via the electric motor responsive to a thrust command while fuel flow to the combustor is inhibited.

In addition to one or more of the features described above, or as an alternative to any of the foregoing embodiments, the hybrid electric propulsion system includes a power source operably coupled to the electric motor.

In addition to one or more of the features described above, or as an alternative to any of the foregoing embodiments, the power source is at least one of the following: a battery; a super capacitor; and an ultra capacitor.

In addition to one or more of the features described above, or as an alternative to any of the foregoing embodiments, the controller is a full authority digital engine control (FADEC) that has full authority over the power source, and the electric motor.

In addition to one or more of the features described above, or as an alternative to any of the foregoing embodiments, the supply pump and the scavenger pump are mechanically coupled to the low speed spool and/or the high speed spool.

In addition to one or more of the features described above, or as an alternative to any of the foregoing embodiments, the supply pump and the scavenger pump are mechanically decoupled from the low speed spool and high speed spool.

In addition to one or more of the features described above, or as an alternative to any of the foregoing embodiments, the hybrid electric propulsion system includes a supplemental electric motor configured to drive the supply pump and the scavenger pump, the electric motor and the supplemental electric motor being independently operated by the controller.

In addition to one or more of the features described above, or as an alternative to any of the foregoing embodiments, the supplemental electric motor is operably coupled to the power source.

In addition to one or more of the features described above, or as an alternative to any of the foregoing embodiments, the bearing further comprises a non-contact seal.

In addition to one or more of the features described above, or as an alternative to any of the foregoing embodiments, the bearing compartment is sealed with a contact seal.

In addition to one or more of the features described above, or as an alternative to any of the foregoing embodiments, the bearing compartment is sealed with a non-contact seal.

In addition to one or more of the features described above, or as an alternative to any of the foregoing embodiments, the lubrication circuit further includes an electrically actuatable valve controlled by the controller.

In addition to one or more of the features described above, or as an alternative to any of the foregoing embodiments, the lubrication circuit further includes a pressure sensor for determining a pressure in the bearing compartment.

In addition to one or more of the features described above, or as an alternative to any of the foregoing embodiments, the lubrication circuit further includes a pressure sensor for determining a pressure outside of the bearing compartment.

In addition to one or more of the features described above, or as an alternative to any of the foregoing embodiments, the controller is a full authority digital engine control (FADEC).

In addition to one or more of the features described above, or as an alternative to any of the foregoing embodiments, the electric motor is connected to an engine accessory gearbox that is operably coupled to the high speed spool.

In addition to one or more of the features described above, or as an alternative to any of the foregoing embodiments, the lubrication circuit further includes an electrically actuatable valve controlled by the controller.

In addition to one or more of the features described above, or as an alternative to any of the foregoing embodiments, the lubrication circuit further includes a pressure sensor for determining a pressure in the bearing compartment.

In addition to one or more of the features described above, or as an alternative to any of the foregoing embodiments, the controller is a full authority digital engine control (FADEC).

In addition to one or more of the features described above, or as an alternative to any of the foregoing embodiments, the power source is at least one of the following: a battery; a super capacitor; and an ultra capacitor.

Also disclosed is a method for controlling an oil pressure in a bearing compartment of a gas turbine engine, the method including: providing power assist to a high speed spool and/or a low speed spool of the gas turbine engine via an electric motor operably coupled to the high speed spool and/or the low speed spool; maintaining a pressure in the bearing compartment or a scavenger line of a lubrication circuit of the gas turbine engine at a desired pressure, the gas turbine engine comprising a bearing compartment, a supply pump, and a scavenger pump; and controlling the electric motor based upon a pressure differential between an interior of the bearing compartment and an exterior of the bearing compartment and via a controller to drive rotation of the low speed spool and/or the high speed spool via the electric motor responsive to a thrust command while fuel flow to a combustor of the gas turbine engine is inhibited.

In addition to one or more of the features described above, or as an alternative to any of the foregoing embodiments, the supply pump and the scavenger pump are mechanically decoupled from the low speed spool and high speed spool and a supplemental electric motor drives the supply pump and the scavenger pump, the electric motor and the supplemental electric motor being independently operated by the controller.

Also disclosed is a hybrid electric propulsion system, including: a gas turbine engine comprising a low speed spool, a high speed spool, and a combustor; a lubrication circuit comprising a bearing compartment, a supply pump, and a scavenger pump; an electric motor configured to augment rotational power of the low speed spool or the high speed spool; a supplemental motor operably coupled to the supply pump or the scavenger pump; and a controller operable to: control the supplemental motor based upon an operational condition of the hybrid electric propulsion system.

In addition to one or more of the features described above, or as an alternative to any of the foregoing embodiments, the operable operational condition of the hybrid electric propulsion system is a pressure differential between an interior of the bearing compartment and an exterior of the bearing compartment.

In addition to one or more of the features described above, or as an alternative to any of the foregoing embodiments, the operable operational condition of the hybrid electric propulsion system is a rotational speed of the low speed spool and/or the high speed spool.

In addition to one or more of the features described above, or as an alternative to any of the foregoing embodiments, the gas turbine engine is a geared turbofan gas turbine engine.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
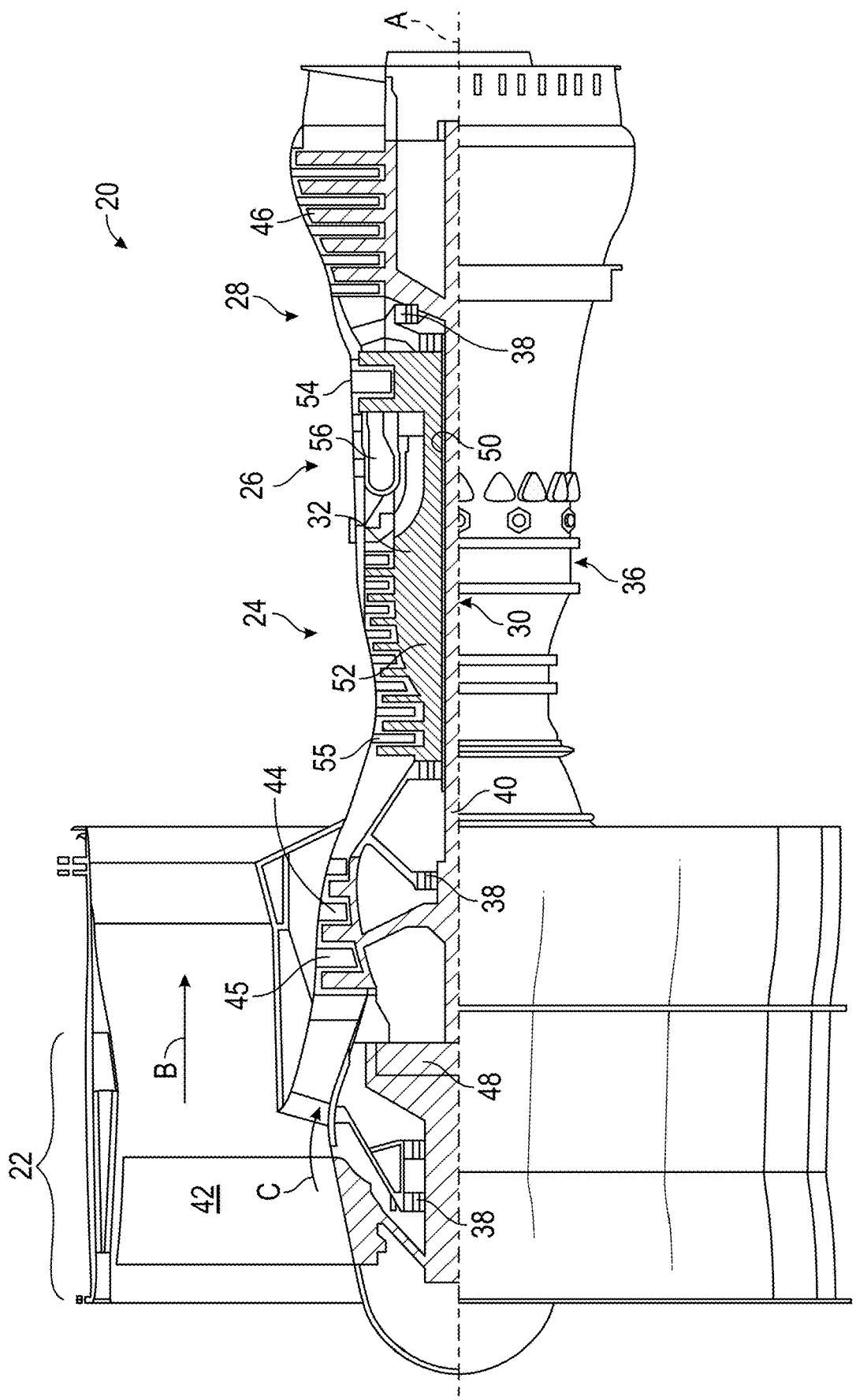
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. In some embodiments, stator vanes 45 in the low pressure compressor 44 and stator vanes 55 in the high pressure compressor 52 may be adjustable during operation of the gas turbine engine 20 to support various operating conditions. In other embodiments, the stator vanes 45, 55 may be held in a fixed position. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }° R)/(518.7° R)]^{0.5}$. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
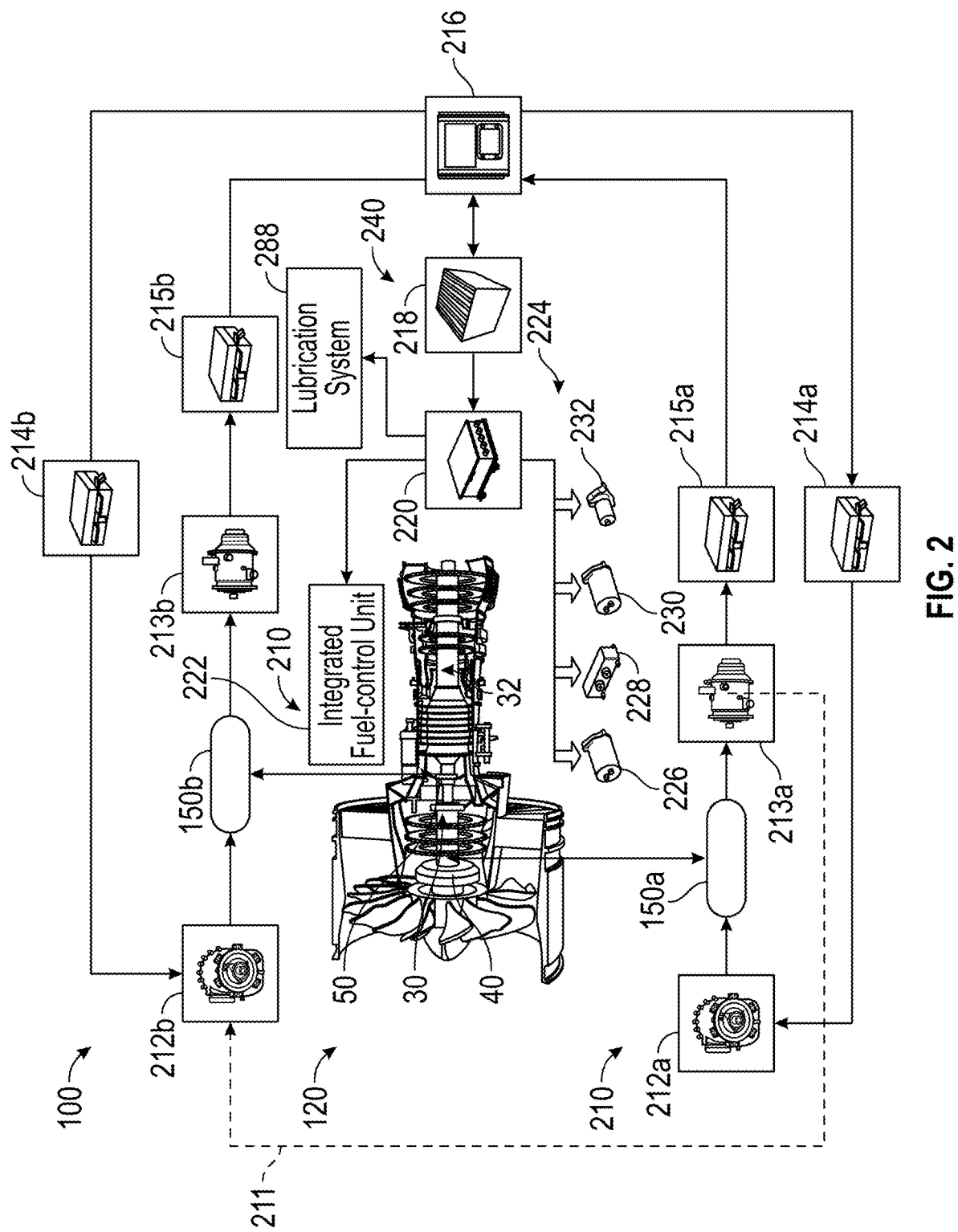
FIG. 2 is a schematic diagram of a hybrid electric propulsion system or hybrid electric engine with physical power flow connections (electrical and mechanical power), in accordance with an embodiment of the disclosure.

FIG. 2 illustrates a hybrid electric propulsion system 100 (also referred to as hybrid gas turbine engine or hybrid electric engine 100) including a gas turbine engine 120 operably coupled to an electrical power system 210 as part of a hybrid electric aircraft. One or more mechanical power transmissions 150 (e.g., 150A, 150B) can be operably coupled between the gas turbine engine 120 and the electrical power system 210. The gas turbine engine 120 can be an embodiment of the gas turbine engine 20 of FIG. 1 and includes one or more spools, such as low speed spool 30 and high speed spool 32, each with at least one compressor section and at least one turbine section operably coupled to a shaft (e.g., low pressure compressor 44 and low pressure turbine 46 coupled to inner shaft 40 and high pressure compressor 52 and high pressure turbine 54 coupled to outer shaft 50 as depicted in FIG. 1). The electrical power system 210 can include a first electric motor 212A configured to augment rotational power of the low speed spool 30 and a second electric motor 212B configured to augment rotational power of the high speed spool 32. Although two electric motors 212A, 212B are depicted in FIG. 2, it will be understood that there may be only a single electric motor (e.g., only electric motor 212B for rotation of the high speed spool as discussed below) or additional electric motors (not depicted). The electrical power system 210 can also include a first electric generator 213A configured to convert rotational power of the low speed spool 30 to electric power and a second electric generator 213B configured to convert rotational power of the high speed spool 32 to electric power. Although two electric generators 213A, 213B are depicted in FIG. 2, it will be understood that there may be only a single electric generator (e.g., only electric generator 213A) or additional electric generators (not depicted). In some embodiments, one or more of the electric motors 212A, 212B can be configured as a motor or a generator (e.g., a motor generator or equivalent electric machine capable of ether providing a rotational force from electrical energy or generating electrical energy from mechanical energy) depending upon an operational mode or system configuration, and thus one or more of the electric generators 213A, 213B may be omitted.

In the example of FIG. 2, the mechanical power transmission 150A includes a gearbox operably coupled between the inner shaft 40 and a combination of the first electric motor 212A and first electric generator 213A. The mechanical power transmission 150B can include a gearbox operably coupled between the outer shaft 50 and a combination of the second electric motor 212B and second electric generator 213B. In embodiments where the electric motors 212A, 212B are configurable between a motor and generator mode of operation, the mechanical power transmission 150A, 150B can include a clutch or other interfacing element(s).

The electrical power system 210 can also include motor drive electronics 214A, 214B operable to condition current to the electric motors 212A, 212B (e.g., DC-to-AC converters). The electrical power system 210 can also include rectifier electronics 215A, 215B operable to condition current from the electric generators 213A, 213B (e.g., AC-to-DC converters). The motor drive electronics 214A, 214B and rectifier electronics 215A, 215B can interface with an energy storage management system 216 that further interfaces with an energy storage system 218. The energy storage management system 216 can be a bi-directional DC-DC converter that regulates voltages between energy storage system 218 and electronics 214A, 214B, 215A, 215B. The energy storage system 218 can include one or more energy storage devices, such as a battery, a super capacitor, an ultra capacitor, and the like. The energy storage management system 216 can facilitate various power transfers within the hybrid electric propulsion system or hybrid electric engine 100. For example, power from the first electric generator 213A can be transferred 211 to the second electric motor 212B as a low speed spool 30 to high speed spool 32 power transfer. Other examples of power transfers may include a power transfer from the second electric generator 213B to the first electric motor 212A as a high speed spool 32 to low speed spool 30 power transfer.

A power conditioning unit 220 and/or other components can be powered by the energy storage system 218. The power conditioning unit 220 can distribute electric power to support actuation and other functions of the gas turbine engine 120. For example, the power conditioning unit 220 can power an integrated fuel control unit 222 to control fuel flow to the gas turbine engine 120. The power conditioning unit 220 can power a supply pump or scavenger pump of a lubrication system 288. The power conditioning unit 220 can power a plurality of actuators 224, such as one or more of a low pressure compressor bleed valve actuator 226, a low pressure compressor vane actuator 228, a high pressure compressor vane actuator 230, an active clearance control actuator 232, and other such effectors. In some embodiments, the low pressure compressor vane actuator 228 and/or the high pressure compressor vane actuator 230 can be omitted where active control of stator vanes 45, 55 of FIG. 1 is not needed. Collectively, any effectors that can change a state of the gas turbine engine 120 and/or the electrical power system 210 may be referred to as hybrid electric system control effectors 240. Examples of the hybrid electric system control effectors 240 can include the electric motors 212A, 212B, electric generators 213A, 213B, integrated fuel control unit 222, actuators 224 and/or other elements (not depicted).

In one non-limiting embodiment and through electrical boost provided to the high speed spool 32 and/or the low speed spool 30 variable vane actuators of the high speed spool 32 and/or the low speed spool 30 may be reduced and/or eliminated as the need for variable vanes may be reduced or eliminated.

Figure 3:
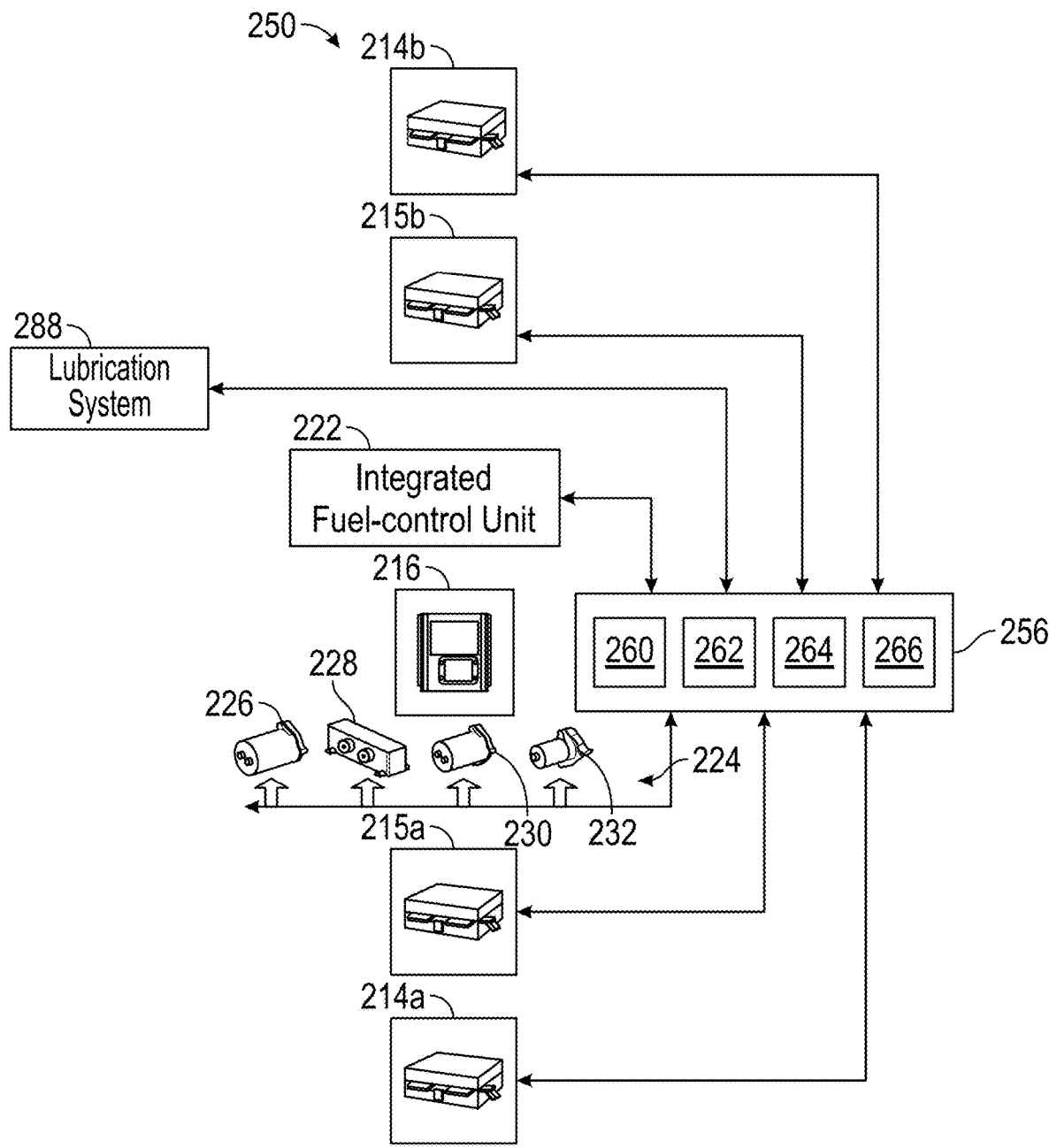
FIG. 3 is a schematic diagram of control signal paths of a hybrid electric propulsion system or hybrid electric engine, in accordance with an embodiment of the disclosure.

FIG. 3 is a schematic diagram of control signal paths 250 of the hybrid electric propulsion system or hybrid electric engine 100 of FIG. 2 and is described with continued reference to FIGS. 1 and 2. A controller 256 can interface with the motor drive electronics 214A, 214B, rectifier electronics 215A, 215B, energy storage management system 216, integrated fuel control unit 222, actuators 224, and/or other components (not depicted) of the hybrid electric propulsion system or hybrid electric engine 100. In embodiments, the controller 256 can control and monitor for fault conditions of the gas turbine engine 120 and/or the electrical power system 210. For example, the controller 256 can be integrally formed or otherwise in communication with a full authority digital engine control (FADEC) of the gas turbine engine 120. In embodiments, the controller 256 can include a processing system 260, a memory system 262, and an input/output interface 264. The controller 256 can also include various operational controls, such as a power transfer control 266 that controls the hybrid electric system control effectors 240 as further described herein.

The processing system 260 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 262 can store data and instructions that are executed by the processing system 260. In embodiments, the memory system 262 may include random access memory (RAM), read only memory (ROM), or other electronic, optical, magnetic, or any other computer readable medium onto which is stored data and algorithms in a non-transitory form. The input/output interface 264 is configured to collect sensor data from the one or more system sensors and interface with various components and subsystems, such as components of the motor drive electronics 214A, 214B, rectifier electronics 215A, 215B, energy storage management system 216, integrated fuel control unit 222, actuators 224, and/or other components (not depicted) of the hybrid electric propulsion system or hybrid electric engine 100. The controller 256 provides a means for controlling the hybrid electric system control effectors 240 based on a power transfer control 266 that is dynamically updated during operation of the hybrid electric propulsion system or hybrid electric engine 100. The means for controlling the hybrid electric system control effectors 240 can be otherwise subdivided, distributed, or combined with other control elements.

The power transfer control 266 can apply control laws and access/update models to determine how to control and transfer power to and from the hybrid electric system control effectors 240. For example, sensed and/or derived parameters related to speed, flow rate, pressure ratios, temperature, thrust, and the like can be used to establish operational schedules and transition limits to maintain efficient operation of the gas turbine engine 120.

Figure 4:
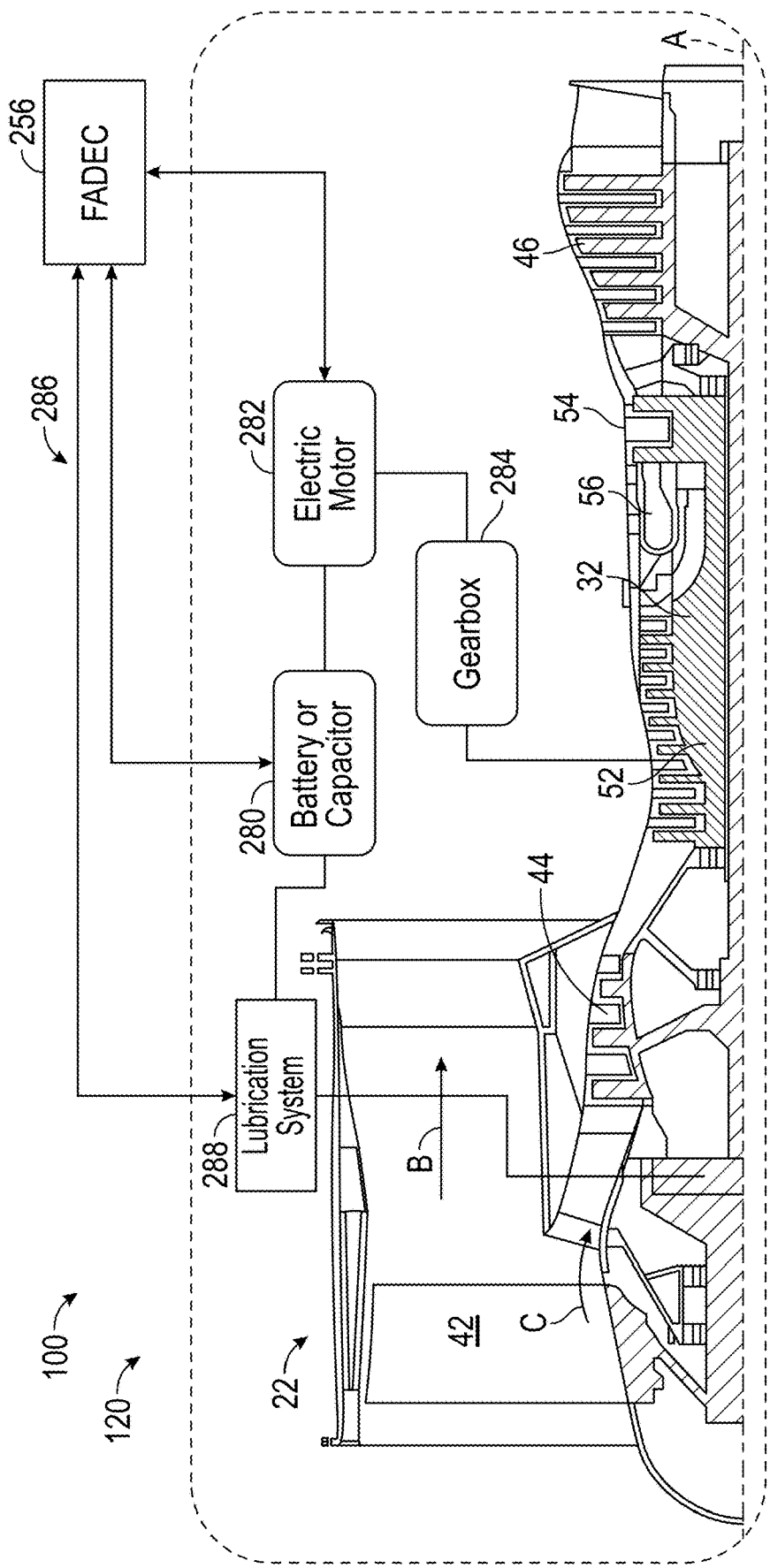
FIG. 4 is a partial cross-sectional illustration of a hybrid electric propulsion system or hybrid electric engine, with a lubrication system in accordance with an embodiment of the disclosure.

Referring now to FIG. 4, a hybrid electric propulsion system 100 (also referred to as hybrid gas turbine engine or hybrid electric engine 100) including a gas turbine engine 120 operably coupled to the electrical power system 210 as part of a hybrid electric aircraft in accordance with one non-limiting embodiment of the present disclosure is illustrated. In this embodiment, the engine 120 has a power source 280 such as a battery, a super capacitor, an ultra capacitor or an equivalent thereof, which supplies power to a motor 282, which is connected to an engine accessory gearbox 284 that is operably coupled to the high speed spool 32 such that the motor 282, when operated will provide power assist to the high speed spool 32 via the accessory gearbox 284. In other words, the accessory gearbox will have at least one component (e.g., a gear train or other equivalent device) operably coupled to the high speed spool 32 and the motor 282 such that operation of the motor 282 will rotate the component which in turn will rotate the high speed spool 32.

In one non-limiting embodiment, motor 282 may be motor 212B illustrated in FIG. 2, which is configured to provide power assist to the high speed spool 32.

In an alternative embodiment, motor 282 may be operatively coupled to the low speed spool 30 via accessory gearbox 284 in order to provide additional thrust to the engine 20. Such as motor 212A illustrated in FIG. 2. In addition and as previously mentioned, power source 280 may be the first electrical generator 213A and/or the second electric generator 213B or any other equivalent device for providing power to motor 282.

The system may be referred to a power assist system 286 that limits or avoids pilot or aircraft control intervention during operation and the full authority digital engine control (FADEC) controls the power source and the engine. As such, the motor 282 provides power to augment the high speed spool 32 and/or the low speed spool 30 responsive to a thrust command to the engine while fuel flow to the combustor is inhibited. During such a thrust command, lubrication must still be provided to a lubrication system of the engine 20.

The power assist to the high speed spool 32 via the motor 282 will allow the motor to also drive a supply pump or scavenger pump mechanically coupled to the spools (e.g., high and/or low) of the engine. This allows for oil supply and oil containment in the lubrication system by electrically driving spools as opposed to driving the engine via fuel which can create seal pressures that need to be compensated for in the bearing compartments of the lubrication system. For example, in anon-hybrid engine without electric assist, oil pumps of a lubrication system are mechanically coupled to at least one of the spools of the engine and the driving of the spools via combustion of fuel will in turn drive the oil pumps of the lubrication system. However and during some operational conditions, it is desirable to provide lubricant to a bearing cavity while also accounting for pressure differentials between the inside and the outside of the bearing cavity that must be accounted for in the lubrication system so that the oil is retained in the bearing compartments or other components where it is desired.

In addition and in combination with the power assist system 286, the hybrid electric engine 100 includes a lubrication system 288 that is configured to operate in conjunction with the power assist system 286.

Figure 5:
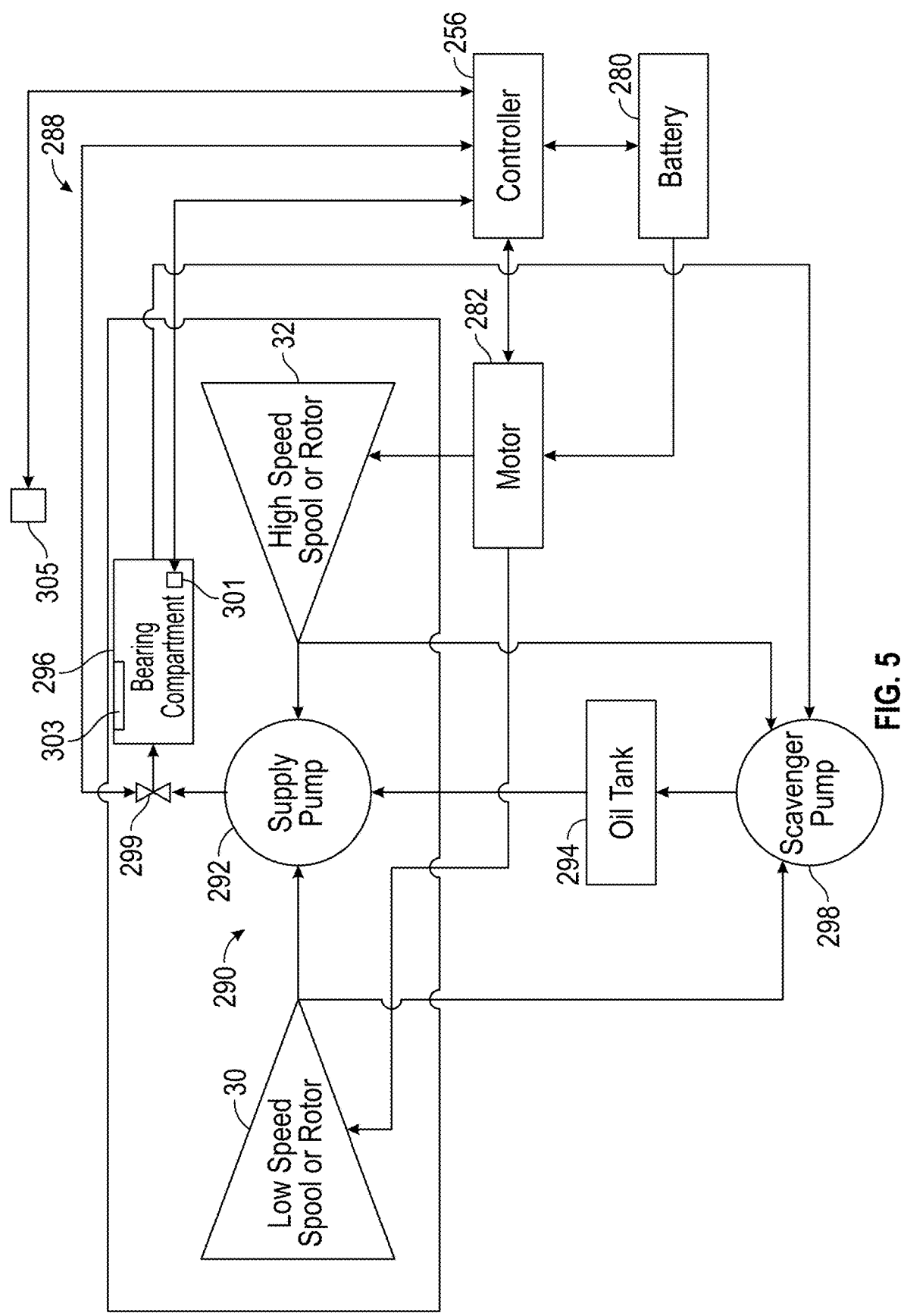
FIG. 5 is a schematic illustration of a lubrication system in accordance with various embodiments of the present disclosure.

Referring now to FIG. 5, a schematic illustration of the lubrication system 288 in accordance with various embodiments of the present disclosure is illustrated. As illustrated, a fluid circuit 290 exits. The fluid circuit 290 includes at least a supply pump 292, an oil tank or reservoir 294, at least one bearing compartment 296 containing a bearing and a scavenger pump 298. The line from the bearing compartment 296 to the scavenger pump 298 may be referred to as a scavenger line.

The supply pump 292 when operated provides a lubricant (e.g., oil or equivalents thereof) from the oil reservoir 294 to the at least one bearing compartment 296 so that the bearing is properly lubricated and oil is also provided to the scavenger pump 298 that is fluidly coupled to the bearing compartment 296 and the oil tank or reservoir 294. Operation of the scavenger pump 298 will cause oil to be drawn from the bearing compartment 296 by the scavenger pump 298. In some non-limiting embodiments disclosed herein, independent operation of the scavenger pump 298 will cause the pressure within the bearing compartment 296 to be reduced. The scavenger pump 298 also provides the oil received from the bearing compartment 296 to the oil reservoir 294. Although only one bearing compartment 296 is illustrated in the FIGS. it is of course understood that the lubrication system 288 may have multiple bearing compartments or a plurality of bearing compartments 296. Still further and although only one supply pump 292 and scavenger pump 298 are illustrated it is, of course, understood that various embodiments of the present disclosure contemplate multiple supply pumps 292 and/or scavenger pumps 298.

In accordance with one embodiment of the present disclosure, the motor 282 is operably coupled to the low speed spool 30 or low speed rotor 30 or the high speed spool 32 or high speed rotor 32 and the supply pump 292 or the scavenger pump 298. By incorporating the lubrication system 288 into a hybrid electric system or engine, the availability of electric power in a hybrid electric system or engine allows for improved oil containment while benefiting from the hybrid electric engine in a geared turbofan engine or a gas turbine engine (e.g., non-geared turbofan engine). It being understood that various embodiments of the present disclosure are applicable to a hybrid electric engine comprising a geared turbofan engine or a gas turbine engine (e.g., non-geared turbofan engine) or any equivalent engine.

In one embodiment, an electric motor, which may be motor 282 or motor 212A or motor 212B drives either the high speed spool 32 or the low speed spool 30 which also drives the supply pump 292 or scavenger pump 298 mechanically coupled to the spools (e.g., high and/or low) of the engine. The benefit of driving the supply pump 292 or scavenger pump 298 by electrically driving the spools as opposed to driving the spools of the engine via combustion of fuel or a limited amount of fuel combustion, seal pressures in the lubrication system 288 can be controlled. As used herein, seal pressure may refer to the pressure differential between an interior and exterior of the bearing compartment(s) 296. In other words, the seal of the bearing compartment 296 is subject to the pressure differential between the interior and the exterior of the bearing compartment 296 and the seal is used to keep the lubricant within the bearing compartment 296.

As such, control of this pressure differential is advantageous in maximizing the efficiency of the seal of the bearing compartment. For example and in order to maintain lubricant in the bearing compartment, it is desirable to maintain the pressure in the bearing compartment 296 at a desired pressure for optimal performance. As used herein, the desired pressure may be a pressure that keeps the pressure differential between the interior and the exterior of the bearing compartment 296 at a value where oil is not passed from the interior of the bearing compartment to the exterior of the bearing compartment through a seal of the bearing compartment. In addition, the desired pressure may be a pressure that keeps the pressure differential between the interior and the exterior of the bearing compartment 296 at a value where air is not forced into the bearing compartment 296 through a seal of the bearing compartment 296.

In various embodiments of the present disclosure, the pressure differential acting upon a seal of the bearing compartment 296 is controlled by operation of the supply pump 292 and/or the scavenger pump 298 and/or the spools (e.g., high and/or low) of the engine where the supply pump 292 and/or the scavenger pump 298 are mechanically coupled to the spools (e.g., high and/or low) of the engine. Still further, operation of the engine where via combustion of fuel (e.g., fuel provided to combustor 56 as is known in the related arts) may also affect the pressure differential acting upon a seal of the bearing compartment 296 due to air flows created during operation of the compressor section of the engine.

The operational connection of motor 282 to the spools 30, 32 and the pumps 292, 298 is illustrated by the lines in FIG. 5. By incorporating the lubrication system 288 into a hybrid electric system or engine, the availability of electric power in a hybrid electric system or engine allows for improved oil containment while benefiting from hybrid electric engine in a geared turbofan engine or any other gas turbine engine (e.g. a non-geared turbofan engine). For example and in this embodiment, the pumps 292, 298 are driven by the spools 30 and/or 32. Here, the motor 282 may supplement the rotational speed of the spools 30 and/or 32 and oil containment in the bearing compartment 296 may be facilitated by driving the pumps 292, 298 without combustion of fuel and/or a reduced amount of fuel supplied to the combustor 56. In other words, electrically driving the spools 30 and/or 32 also allows for enhanced oil containment in the bearing compartment(s) 296 by controlling the electrical operation of the pumps 292, 298 via controlling operation of motor 282 that is operably coupled to the spools 30 and/or 32.

Figure 6:
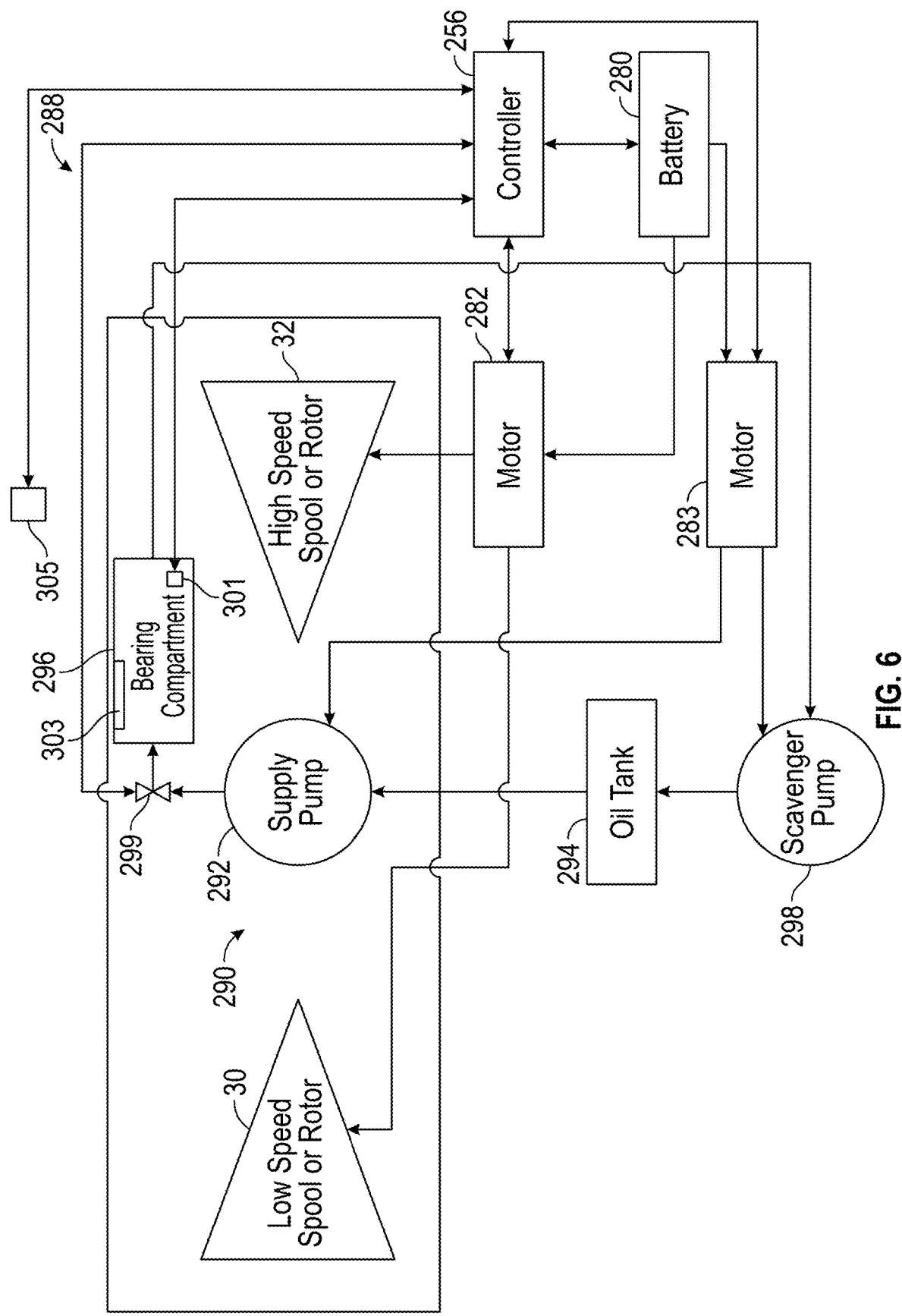
FIG. 6 is a schematic illustration of a lubrication system in accordance with various embodiments of the present disclosure.

Referring now to FIG. 6, a schematic illustration of the lubrication system 288 in accordance with various embodiments of the present disclosure is illustrated. In this embodiment, a supplemental motor 283 is provided for driving the supply pump 292 and/or the scavenger pump 298 while motor 282, or motor 212A or motor 212B is provided for driving the high and low spools 30, 32. In this embodiment, the supply pump 292 and scavenger pump 298 are mechanically decoupled from the high and low spools 30, 32. As previously mentioned, oil containment in the bearing compartment 296 may be facilitated by electrically driving the pumps 292, 298. In this embodiment, the supply pump 292 and the scavenger pump 298 are mechanically decoupled from the high and low spools 30, 32 and thus control of supplemental motor 283 controls operation of the pumps and the pressure differential of the seal or seals of the bearing compartment(s) is facilitated by controlling motor 283 as well as motor 282.

Again and by electrically driving the spools 30, 32 as opposed to driving the spools 30, 32 via combustion of fuel in the combustor 56, seal pressures of the bearing compartment(s) 296 are controlled in a more robust manner. For example, by using electrical assist to anyone of the high speed spool or rotor 32, the low speed spool or rotor 30, the supply pump 292 and the scavenger pump 298, the internal pressure in the bearing compartment is managed so that oil is maintained in the bearing compartment(s) 296. The operational connection of motor 282 to the spools 30, 32 and motor 283 to the pumps 292, 298 is illustrated by the lines in FIG. 6.

Still further and in the embodiment illustrated in at least FIG. 6, the controller 256 is operable to control the supplemental motor 283 based upon an operational condition of the hybrid electric propulsion system, which as mentioned above, may be the pressure differential between an interior of the bearing compartment and an exterior of the bearing compartment. In yet another implementation, the operable operational condition of the hybrid electric propulsion system is a rotational speed of the low speed spool and/or the high speed spool. This rotational speed may be provided by one or more sensors operably coupled to the controller and configured to provide an indication of the rotational speed of the low speed spool and/or the high speed spool. Rotational speed of the low speed spool and/or the high speed spool may affect oil containment in the bearing compartment as pressures outside of the bearing compartment may vary due to variations in the rotational speed of the low speed spool and/or the high speed spool, which may be attributable to operating the first electric generator 213A configured to convert rotational power of the low speed spool 30 to electric power and/or the second electric generator 213B configured to convert rotational power of the high speed spool 32 to electric power. In other words, operation of the first electric generator 213A and/or the second electric generator 213B may slow the rotation of the low speed spool and/or the high speed spool which may affect the pressure differential at the seal of the bearing compartment. Alternatively, this slowing of the low speed spool and/or the high speed spool may be due to the electric motor 282 or one or more of the electric motors 212A, 212B being configured as a motor or a generator depending upon an operational mode or system configuration.

Figure 7:
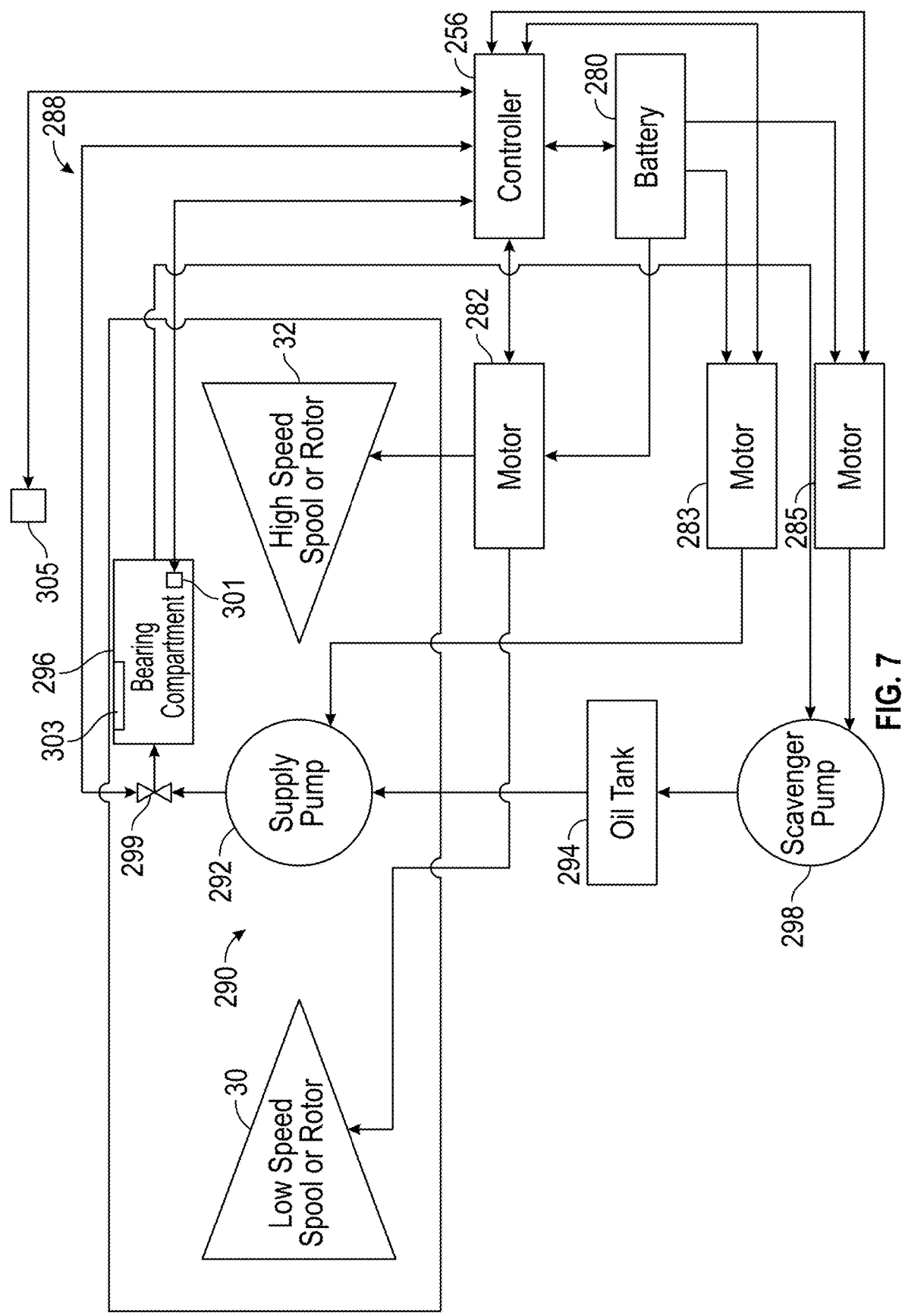
FIG. 7 is a schematic illustration of a lubrication system in accordance with various embodiments of the present disclosure.

In yet another alternative and as illustrated in FIG. 7, a separate motor can be provided for each of the supply pump and the scavenger pump. This additional motor is illustrated as motor 285 in FIG. 7. As previously mentioned, oil containment in the bearing compartment 296 may be facilitated by electrically driving the pumps 292, 298. In this embodiment, the supply pump 292 and the scavenger pump 298 are mechanically decoupled from the high and low spools 30, 32 and thus control of motors 283 and 285 controls operation of the pumps and the pressure differential of the seal or seals of the bearing compartment(s) is facilitated by controlling motors 283 and 285 as well as motor 282. In this embodiment, operation of the supply pump 292 is independent of scavenger pump 298 as well as rotation of spools 30 and 32.

Still further and in the embodiment illustrated in at least FIG. 7, the controller 256 is operable to control motor 283 and/or motor 285 based upon an operational condition of the hybrid electric propulsion system, which as mentioned above, may be the pressure differential between an interior of the bearing compartment and an exterior of the bearing compartment. In yet another implementation, the operable operational condition of the hybrid electric propulsion system is a rotational speed of the low speed spool and/or the high speed spool. This rotational speed may be provided by one or more sensors operably coupled to the controller and configured to provide an indication of the rotational speed of the low speed spool and/or the high speed spool. Rotational speed of the low speed spool and/or the high speed spool may affect oil containment in the bearing compartment as pressures outside of the bearing compartment may vary due to variations in the rotational speed of the low speed spool and/or the high speed spool, which may be attributable to operating the first electric generator 213A configured to convert rotational power of the low speed spool 30 to electric power and/or the second electric generator 213B configured to convert rotational power of the high speed spool 32 to electric power. In other words, operation of the first electric generator 213A and/or the second electric generator 213B may slow the rotation of the low speed spool and/or the high speed spool which may affect the pressure differential at the seal of the bearing compartment. Alternatively, this slowing of the low speed spool and/or the high speed spool may be due to the electric motor 282 or one or more of the electric motors 212A, 212B being configured as a motor or a generator depending upon an operational mode or system configuration.

Still further and in yet another alternative embodiment an electrically actuatable valve 299 may be located in the lubrication system 288 of any of the aforementioned embodiments. The electrically actuatable valve 299 can be controlled by controller 256 in order to control the changes in pressure in the bearing compartment 296 in combination with controlling the speed of the supply and/or scavenger pump as well as spools 30 and 32. Although one specific location is illustrated for valve 299 any other suitable location is contemplated to be with the scope of various embodiments of the present disclosure. Still further and in yet another alternative, the lubrication system 288 of any of the aforementioned embodiments may have a plurality of valves 299.

As used herein control of the changes in pressure in the bearing compartment 296 in order to manage or maintain the pressure differential at the bearing seal may be achieved by receiving pressure signals from a sensor or pressure sensor 301 located in the lubrication system 288, For example, a sensor or pressure sensor 301 may be located in the bearing compartment(s) 296 as well as a sensor or pressure sensor 305 located outside of the bearing compartment(s) 296 so that a pressure differential between the interior or exterior of the bearing compartment(s) 296 can be determined. As such, the sensor or pressure sensor 301 will be able to provide an indication of the pressure (e.g., oil pressure or other equivalent pressure reading) in the bearing compartment(s) 296 and the sensor or pressure sensor 305 will be able to provide an indication of the pressure outside of the bearing compartment(s) 296 (e.g., air pressure or other equivalent pressure). The sensors or pressure sensors 301, 305 are in operable communication with the controller 256. Although one specific location is illustrated for sensors or pressure sensors 301, 305 any other suitable location for providing the required pressure readings is contemplated to be with the scope of various embodiments of the present disclosure. It is, of course, understood that the pressure sensors 301 and 305 may be used in conjunction with any of the aforementioned embodiments.

Bearing compartment 296 will include a seal 303 in order to contain the oil in the bearing compartment(s) 296 of the bearing. It is, of course, understood that the seal 303 is used in conjunction with any of the aforementioned embodiments. In one embodiment, the seal 303 may be a non-contact seal in order to contain the oil within the bearing compartment. Alternatively and in yet another embodiment, the seal 303 may be a contact seal in order to contain the oil within the bearing compartment.

Control means for controlling the lubrication system 288 of any of the aforementioned embodiments can be a controller or other suitable control system such as controller 256 (FIGS. 2-7) for receiving output signals representing sensed data from the operably connected components of the lubrication system 288.

In one embodiment and as mentioned above, the controller 256 can control and monitor for fault conditions of the gas turbine engine 120 and/or the electrical power system 210. For example, the controller 256 can include a processing system 260, a memory system 262, and an input/output interface 264.

The input/output interface 264 is configured to collect sensor data from the one or more system sensors and interface with various components and subsystems, such as the lubrication system 288 and components thereof as well as components of the motor drive electronics 214A, 214B, rectifier electronics 215A, 215B, energy storage management system 216, integrated fuel control unit 222, actuators 224, and/or other components (not depicted) of the hybrid electric propulsion system or hybrid electric engine 100. Thus, the controller 256 provides a means for controlling the hybrid electric system control effectors 240 based on a power transfer control 266 that is dynamically updated during operation of the hybrid electric propulsion system or hybrid electric engine 100. The means for controlling the hybrid electric system control effectors 240 can be otherwise subdivided, distributed, or combined with other control elements.

The power transfer control 266 can apply control laws and access/update models to determine how to control and transfer power to and from the hybrid electric system control effectors 240. For example, sensed and/or derived parameters related to speed, flow rate, pressure ratios, temperature, thrust, fuel flow, power provided by motor 282, power provided by motor 283, power provided by motor 285 and the like can be used to establish operational schedules and transition limits to maintain efficient operation of the gas turbine engine 120.

As such, the controller 256 is capable of controlling the lubrication system 288 by sensing the aforementioned parameters related to speed, flow rate, pressure ratios, temperature, thrust, fuel flow, power provided by motor 282, power provided by motor 283, power provided by motor 285 and the like. Once, the controller determines that the engine 120 is in an operating condition that requires actuation of the lubrication system 288 it causes power to be supplied from a power source 280 to the lubrication system 288 in order to provide the lubrication.

For example and in one non-limiting embodiment, the controller 256 in any of the aforementioned embodiments can enhance or control oil containment in the bearing compartment(s) 296 by controlling operation of motor 282, motor 283, and motor 285 by providing power thereto or limiting power thereto in order to control a pressure differential at the seal 303 of the bearing compartment(s) 296. As mentioned above, control of motor 282, motor 283, and motor 285 may be dependent upon signals received from sensors 301 and 305 as well as other operational parameters (e.g., speed, flow rate, pressure ratios, temperature, thrust, fuel flow). It is, of course, understand that other operational parameters are considered to be within the scope of various embodiments of the present disclosure.

As used herein radially outward is intended to be in the direction away from the engine central longitudinal axis A.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hybrid electric propulsion system, comprising:
a gas turbine engine comprising a low speed spool, a high speed spool, and a combustor;
a lubrication circuit comprising a bearing compartment, a supply pump, and a scavenger pump;
an electric motor configured to augment rotational power of the low speed spool or the high speed spool; and
a controller operable to:
control the electric motor based upon a pressure differential between an interior of the bearing compartment and an exterior of the bearing compartment and to drive rotation of the low speed spool and/or the high speed spool via the electric motor responsive to a thrust command while fuel flow to the combustor is inhibited.

2. The hybrid electric propulsion system as in claim 1, further comprising a power source operably coupled to the electric motor.

3. The hybrid electric propulsion system as in claim 2, wherein the power source is at least one of the following: a battery; a super capacitor; and an ultra capacitor, wherein the controller is a full authority digital engine control (FADEC) that has full authority over the power source, and the electric motor.

4. The hybrid electric propulsion system as in claim 2, wherein the supply pump and the scavenger pump are mechanically decoupled from the low speed spool and high speed spool.

5. The hybrid electric propulsion system as in claim 4, further comprising a supplemental electric motor configured to drive the supply pump and the scavenger pump, the electric motor and the supplemental electric motor being independently operated by the controller.

6. The hybrid electric propulsion system as in claim 5, wherein the supplemental electric motor is operably coupled to the power source.

7. The hybrid electric propulsion system as in claim 6, wherein the lubrication circuit further comprises an electrically actuatable valve controlled by the controller and the lubrication circuit further comprises a pressure sensor for determining a pressure in the bearing compartment.

8. The hybrid electric propulsion system as in claim 1, wherein the supply pump and the scavenger pump are mechanically coupled to the low speed spool and/or the high speed spool.

9. The hybrid electric propulsion system as in claim 1, wherein the bearing compartment is sealed with a non-contact seal.

10. The hybrid electric propulsion system as in claim 1, wherein the bearing compartment is sealed with a contact seal.

11. The hybrid electric propulsion system as in claim 1, wherein the lubrication circuit further comprises an electrically actuatable valve controlled by the controller.

12. The hybrid electric propulsion system as in claim 1, wherein the lubrication circuit further comprises a pressure sensor for determining a pressure in the bearing compartment and/or a pressure sensor for determining a pressure outside of the bearing compartment.

13. The hybrid electric propulsion system as in claim 1, wherein the controller is a full authority digital engine control (FADEC).

14. The hybrid electric propulsion system as in claim 1, wherein the electric motor is connected to an engine accessory gearbox that is operably coupled to the high speed spool.

15. The hybrid electric propulsion system as in claim 1, wherein the gas turbine engine is a geared turbofan gas turbine engine.

16. A method for controlling an oil pressure in a bearing compartment of a lubrication circuit of a gas turbine engine, comprising:

provulsion power assist to a high speed spool and/or a low speed spool of the gas turbine engine via an electric motor operably coupled to the high speed spool and/or the low speed spool;

maintaining a pressure in the bearing compartment or a scavenger line of the lubrication circuit of the gas turbine engine at a desired pressure, the gas turbine engine comprising the bearing compartment, a supply pump, and a scavenger pump operably coupled to the lubrication circuit; and controlling the electric motor based upon a pressure differential between an interior of the bearing compartment and an exterior of the bearing compartment via a controller to drive rotation of the low speed spool and/or the high speed spool via the electric motor responsive to a thrust command while fuel flow to a combustor of the gas turbine engine is inhibited.

17. The method as in claim 16, wherein the supply pump and the scavenger pump are mechanically decoupled from the low speed spool and high speed spool and a supplemental electric motor drives the supply pump and the scavenger pump, the electric motor and the supplemental electric motor being independently operated by the controller.

* * * * *